US008580382B2

(12) United States Patent
Sato et al.

(10) Patent No.: US 8,580,382 B2
(45) Date of Patent: Nov. 12, 2013

(54) COATED METAL PIGMENT, METHOD FOR PRODUCTION OF THE SAME, AND COATING COMPOSITION CONTAINING THE SAME

(75) Inventors: Takayuki Sato, Osaka (JP); Taro Morimitsu, Osaka (JP); Shunichi Setoguchi, Osaka (JP); Yoshiki Hashizume, Osaka (JP)

(73) Assignee: Toyo Aluminium Kabushiki Kaisha, Osaka-shi (JP)

( * ) Notice: Subject to any disclaimer, the term of this patent is extended or adjusted under 35 U.S.C. 154(b) by 796 days.

(21) Appl. No.: 11/922,851

(22) PCT Filed: Oct. 6, 2006

(86) PCT No.: PCT/JP2006/320047
§ 371 (c)(1),
(2), (4) Date: Dec. 26, 2007

(87) PCT Pub. No.: WO2007/043453
PCT Pub. Date: Apr. 19, 2007

(65) Prior Publication Data
US 2009/0117281 A1    May 7, 2009

(30) Foreign Application Priority Data
Oct. 13, 2005    (JP) ................. 2005-298854

(51) Int. Cl.
*B05D 3/10*    (2006.01)
*C08K 11/00*    (2006.01)
*C08K 3/32*    (2006.01)
*C08K 3/22*    (2006.01)

(52) U.S. Cl.
USPC .......... 428/403; 428/404; 428/405; 428/407; 523/206; 524/414; 524/430; 524/539

(58) Field of Classification Search
USPC ................................ 428/403–407
See application file for complete search history.

(56) References Cited

U.S. PATENT DOCUMENTS

| | | | |
|---|---|---|---|
| 2,885,366 A | | 5/1959 | Iler |
| 4,750,940 A | * | 6/1988 | Higashi et al. ............... 524/439 |
| 4,869,754 A | | 9/1989 | Kawabe et al. |
| 5,332,767 A | * | 7/1994 | Reisser et al. ............... 523/209 |
| 5,540,768 A | * | 7/1996 | Yamamoto et al. ........... 106/404 |
| 5,856,379 A | * | 1/1999 | Shiratsuchi et al. ........... 523/209 |
| 2002/0102407 A1 | * | 8/2002 | Huybrechts et al. ........... 428/413 |
| 2002/0117084 A1 | * | 8/2002 | Hayashi et al. ................. 106/456 |
| 2004/0151910 A1 | * | 8/2004 | Koller et al. .................. 428/403 |
| 2004/0194663 A1 | | 10/2004 | Li et al. |
| 2005/0006093 A1 | * | 1/2005 | Nguyen ........................ 166/281 |
| 2005/0142343 A1 | * | 6/2005 | Winkler et al. ............... 428/212 |
| 2006/0150864 A1 | | 7/2006 | Hashizume et al. |

FOREIGN PATENT DOCUMENTS

| | | |
|---|---|---|
| EP | 0 170 474 A2 | 2/1986 |
| EP | 0 477 433 A2 | 4/1992 |
| EP | 0 583 919 A1 | 2/1994 |
| EP | 1 619 222 A1 | 1/2006 |
| JP | 55-90560 A | 7/1980 |
| JP | 55-90561 A | 7/1980 |
| JP | 61-47771 A | 3/1986 |
| JP | 62-253668 A | 11/1987 |
| JP | 63-54475 A | 3/1988 |
| JP | 64-40566 A | 2/1989 |
| JP | 1-129070 A | 5/1989 |
| JP | 6-9897 A | 1/1994 |
| JP | 6-57171 A | 3/1994 |
| JP | 7-3185 A | 1/1995 |
| JP | 7-133440 A | 5/1995 |
| JP | 10-306229 A | 11/1998 |
| JP | 10306229 A * | 11/1998 |
| JP | 2002-121423 A | 4/2002 |
| JP | 2003-41150 A | 2/2003 |
| JP | 2003-252916 A | 9/2003 |
| JP | 2004-124069 A | 4/2004 |
| JP | 2004-131542 A | 4/2004 |
| JP | 2004124069 A * | 4/2004 |
| WO | WO-96/38506 A1 | 12/1996 |
| WO | WO 2004/006921 A1 | 11/2004 |

OTHER PUBLICATIONS

Allen et al., Tables of Bond Lengths . . . Bond Lengths of Organic Compounds, J. Chem. Soc. Perkin. Trans. II, Issue 1 (1987).*
Machine translation of JP 2004-124069A.*

* cited by examiner

*Primary Examiner* — Mark Ruthkosky
*Assistant Examiner* — Alexandre Ferre
(74) *Attorney, Agent, or Firm* — Birch, Stewart, Kolasch & Birch, LLP

(57) ABSTRACT

Provided are a coated metal pigment which can satisfy both the coating stability in use as an aqueous coating, i.e., water resistance, and the chemical resistance of coating films produced by application thereof at practically satisfactory levels; a method for producing the same; and an aqueous coating containing the same. The invention relates to a coated metal pigment including a metal pigment and a composite coating layer, wherein the composite coating layer includes an adhesion layer which is disposed on the surface of the metal pigment either in contact with the metal pigment or at an interposition of another layer and contains polysiloxane and/or silica, and a resin layer which is disposed on the surface of the adhesion layer either in contact with the adhesion layer or at an interposition of another layer.

16 Claims, No Drawings

COATED METAL PIGMENT, METHOD FOR PRODUCTION OF THE SAME, AND COATING COMPOSITION CONTAINING THE SAME

TECHNICAL FIELD

The present invention relates to coated metal pigments which can be contained in, for example, metallic coatings to be used for coating metals or plastics, to methods for the production of the same, and to coating compositions containing the same. In particular, it relates to coated metal pigments which show excellent coating storage stability, i.e., excellent water resistance when being used as an aqueous coating and also show excellent chemical resistance when coating films are formed therefrom, to methods for the production of the same, and to coating compositions containing the same.

BACKGROUND ART

In recent years, because of growing interest about environmental problems, aqueous coatings and powder coatings have attracted attention as low-pollution coatings free from organic solvents. Also in such coating systems, metallic finery is required in various applications like the conventional organic solvent-based coatings. Use of metal pigments is therefore indispensable. In powder coating, however, objects to be coated are limited substantially only to metals because of restrictions due to electrostatic coating and high temperature baking. In the case of aqueous coatings, there may be problems that a metal pigment reacts with water in the coating to turn black or generate a hydrogen gas. A current problem is how to secure the storage stability of coatings.

In order to solve a problem about storage stability in use as an aqueous coating, i.e., a problem about water resistance, some technologies have already been developed, for example: a method in which a metal pigment is treated with a phosphoric acid-based or phosphate-based additive (Japanese Patent Laying-Open No. 63-054475 (Patent document 1), Japanese Patent Laying-Open No. 61-47771 (Patent document 2), and Japanese Patent Laying-Open No. 7-133440 (Patent document 3)), a method in which a metal pigment is treated with Mo (molybdenum) compound (Japanese Patent Laying-Open No. 6-057171 (Patent document 4)), and a method in which a metal pigment is coated with an oxide film such as silica (Japanese Patent Laying-Open No. 2003-41150 (Patent document 5), Japanese Patent Laying-Open No. 2004-131542 (Patent document 6), and Japanese Patent Laying-Open No. 2004-124069 (Patent document 7)).

On the other hand, from a viewpoint of cost, for example in plastic coating for cellular phones, personal computers and the like, one-layer coating is required. In this case, excellent chemical resistance is also required. As an approach for improving the chemical resistance, aluminum pigments coated with a resin (Japanese Patent Laying-Open No. 62-253668 (Patent document 8), Japanese Patent Laying-Open No. 64-40566 (Patent document 9)), and the like have been developed. However, although organic solvent-based coatings can satisfy the market demand, there is a problem of poor water resistance when being used as an aqueous coating.

In general, there is a tendency that it is difficult to satisfactorily impart chemical resistance in surface treatment for imparting water resistance and it is difficult to satisfactorily impart water resistance in surface treatment for imparting chemical resistance. Therefore, no technologies of reconciling water resistance and chemical resistance at practically satisfactory levels have been established. Although there are some attempts to satisfy both water resistance and chemical resistance at a high level by combined use of a technology of imparting storage stability in aqueous coatings and a resin coating technique (U.S. Pat. No. 2,885,366 specification (Patent document 10), Japanese Patent Laying-Open No. 1-129070 (Patent document 11), Japanese Patent Laying-Open No. 7-3185 (Patent document 12), and Japanese Patent Laying-Open No. 2002-121423 (Patent document 13)), none of them has reached a practically satisfactory level.

Patent document 1: Japanese Patent Laying-Open No. 63-054475
Patent document 2: Japanese Patent Laying-Open No. 61-47771
Patent document 3: Japanese Patent Laying-Open No. 7-133440
Patent document 4: Japanese Patent Laying-Open No. 6-057171
Patent document 5: Japanese Patent Laying-Open No. 2003-41150
Patent document 6: Japanese Patent Laying-Open No. 2004-131542
Patent document 7: Japanese Patent Laying-Open No. 2004-124069
Patent document 8: Japanese Patent Laying-Open No. 62-253668
Patent document 9: Japanese Patent Laying-Open No. 64-40566
Patent document 10: U.S. Pat. No. 2,885,366 specification
Patent document 11: Japanese Patent Laying-Open No. 1-129070
Patent document 12: Japanese Patent Laying-Open No. 7-3185
Patent document 13: Japanese Patent Laying-Open No. 2002-121423

DISCLOSURE OF THE INVENTION

Problems to be Solved by the Invention

The present invention intends to solve the above-mentioned problems and provide a coated metal pigment which can satisfy both the coating stability in use as an aqueous coating, namely, water resistance and the chemical resistance of a coating film formed from the aqueous coating at practically satisfactory levels, a method for the production of the same, and a coating composition containing the same.

Means for Solving the Problems

The present invention relates to a coated metal pigment including a metal pigment and a composite coating layer, wherein the composite coating layer includes an adhesion layer which is disposed on the surface of the metal pigment either in contact with the metal pigment or at an interposition of another layer and contains polysiloxane and/or silica, and a resin layer which is disposed on the surface of the adhesion layer either in contact with the adhesion layer or at an interposition of another layer.

In the coated metal pigment of the present invention, a layer including an oxide or a hydrate containing at least one sort selected from Mo, P and Al is preferably further formed between the metal pigment and the adhesion layer.

The resin layer in the coated metal pigment of the present invention is preferably a copolymer obtained by copolymerization of at least three kinds of monomers including a reactive monomer having a carboxyl group and/or a phosphoric acid group, a polyfunctional acrylic ester monomer with three or more functionalities, and a polymerizable monomer having a benzene nucleus.

The another layer disposed on the surface of the adhesion layer in the coated metal pigment of the present invention is preferably a coupling agent layer which includes a silane coupling agent having a hydrophobic group or a silylation agent having a hydrophobic group.

The present invention relates also to a method of coated metal pigment production for obtaining the coated metal pigment mentioned above, including: an adhesion layer formation step which includes mixing the metal pigment with a solvent containing an alkoxysilane, water and a hydrolysis catalyst and forming the adhesion layer on the surface of the metal pigment through hydrolysis and condensation of the alkoxysilane; a hydrophobization step which includes hydrophobizing the surface of the adhesion layer; and a resin layer formation step which includes dispersing the hydrophobized metal pigment in a nonpolar solvent containing a polymerization initiator and at least three kinds of monomers including a reactive monomer having a carboxyl group and/or a phosphoric acid group, a polyfunctional acrylic ester monomer with three or more functionalities and a polymerizable monomer having a benzene nucleus to deposit the resin layer including a copolymer of the monomers on the surface of the metal pigment.

In the production method of the present invention, it is preferable that the ratio of the average particle diameter (A) of the coated metal pigment to the average particle diameter (B) of the metal pigment before the adhesion layer formation step, (A)/(B), is not less than 1.0 and not more than 1.1.

The production method of the present invention preferably further has a step of forming, before the adhesion layer formation step, a layer including an oxide or a hydrate containing at least one sort selected from Mo, P and Al on the surface of the metal pigment.

The present invention relates also to the coated metal pigment mentioned above and a coating composition containing the coated metal pigment obtained by the method mentioned above and a binder.

Effects of the Invention

Use of the coated metal pigment of the present invention makes it possible to satisfy both the storage stability of an aqueous metallic coating for use in coating metals, plastics, and the like and the chemical resistance of a coating film. Moreover, the coated metal pigment of the present invention is produced also as a copper alloy pigment, a silver-coated glass flake, and the like, which can be prevented from discoloring in a coating and in a coating film.

BEST MODES FOR CARRYING OUT THE INVENTION

In the coated metal pigment of the present invention, a layer containing polysiloxane and/or silica is formed as an adhesion layer in contact with a metal pigment or at an interposition of another layer and further a resin layer is formed on the surface of the adhesion layer in contact with the adhesion layer or at an interposition of another layer.

Preferable examples of the material of the metal pigment used in the present invention include aluminum and its alloy, iron and its alloy (for example, stainless steel), copper and its alloy (for example, bronze), and materials prepared by coating metals, such as Ag, Cu, Ni, Ti and Fe, or an alloy thereof on glass flakes by plating, PVD or the like.

The particle diameter and shape of a metal pigment are not particularly restricted, but those having an average major axis of from 1 to 100 µm and a thickness of from 0.01 to 5 µm are preferred.

The adhesion layer of the present invention is a layer containing polysiloxane and/or silica. It is preferable that polysiloxane or silica is the principal component of the adhesion layer, in other words, that 50 mass % or more of the adhesion layer is accounted for by polysiloxane or silica. Polysiloxane can be formed, for example, by hydrolysis and condensation of an alkoxysilane.

Examples of the alkoxysilane include tetraethoxysilane, tetramethoxysilane, tetraisopropoxysilane and condensates thereof.

In use of an alkoxysilane, the reaction shown below is caused to proceed by feeding a metal pigment and the alkoxysilane into a solvent, such as methyl alcohol, ethyl alcohol, isopropyl alcohol, n-propyl alcohol, tert-butyl alcohol, n-butyl alcohol, isobutyl alcohol, ethylcellosolve, butylcellosolve, propylene glycol monobutyl ether, dipropylene glycol monomethyl ether or propylene glycol monopropyl ether, to hydrolyze and then condense the alkoxysilane,

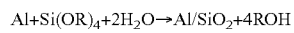

$$Al+Si(OR)_4+2H_2O \rightarrow Al/SiO_2+4ROH$$

and as a result, a coating film containing polysiloxane or silica as a principal component is formed on the surface of the metal pigment. The thus produced coating film adheres firmly to the surface of the metal pigment to form the adhesion layer in the present invention and improves the stability of the metal pigment in a coating composition.

The thickness of the adhesion layer of the present invention is preferably about 5 to 50 nm. When the thickness of the adhesion layer is 5 nm or more, good water resistance is imparted in use of the coated metal pigment of the present invention as an aqueous coating; when it is 50 nm or less, the gloss of the metal pigment is not affected and good design is obtained.

In the coated metal pigment of the present invention, a resin layer is formed on the surface of the adhesion layer in contact with the adhesion layer or at an interposition of another layer. The resin layer has an effect of improving the chemical resistance of a coating film because it can bond firmly to the coating resin, which is a constituent of the coating film.

As the resin constituting the resin layer, a resin substantially insoluble in organic solvents and water is preferably used. In particular, it is preferable to use a resin insoluble both in the organic solvent which can be used as a solvent in the preparation of a coating containing the coated metal pigment of the present invention and in water. Examples of such organic solvents include alcohols such as ethyl alcohol, isopropyl alcohol, n-propyl alcohol, n-butyl alcohol, tert-butyl alcohol, isobutyl alcohol, isoamyl alcohol, n-hexyl alcohol, 2-ethylhexyl alcohol, diacetone alcohol and ethylene glycol; esters such as ethyl acetate, n-butyl acetate, isoamyl acetate and cellosolve acetate; ketones such as acetone, methyl ethyl ketone, methyl isobutyl ketone and cyclohexanone; polyhydric alcohol ethers such as ethylcellosolve, butylcellosolve, propylene glycol monomethyl ether, propylene glycol monopropyl ether, propylene glycol monobutyl ether, dipropylene glycol monomethyl ether and butylcarbitol; and hydrocarbons such as toluene, xylene, solvent naphtha, cyclohexane, n-hexane, n-heptane, isooctane, mineral spirit and petroleum benzine. Use of a resin substantially insoluble in at least one of these organic solvents and in water, in particular, a resin substantially insoluble in all of these organic solvents and in water is preferable because a resin layer can exist in a coating stably for a long period of time and chemical resistance achieved when being formed into a coating film is maintained for a long time.

In this description, the fact that the resin constituting the resin layer is substantially insoluble in an organic solvent and in water can be made sure on the basis of the fact that, in both cases where a coated metal pigment is dispersed in an organic solvent and in water, followed by being left at rest at 40° C. for 10 days, the amount of the resin eluted from the coated metal pigment is not more than 5 g per 100 g of the resin layer of the coated metal pigment.

Examples of the resin constituting the resin layer of the present invention include acrylic ester copolymers, polyester resins, epoxy resins, polyurethane resins, polyethylene resins and polystyrene resins. Acrylic ester copolymers having a three-dimensional cross-linked structure are particularly preferred. In the coated metal pigment of the present invention, it is preferable that the resin layer is formed so that the amount of the resin layer is within the range of from 1 to 100 parts by mass, preferably from 5 to 50 parts by mass, per 100 parts by mass of the metal pigment. When the amount of the resin layer is 1 part by mass or more, good chemical resistance is obtained; when it is 100 parts by mass or less, the gloss of the metal pigment is hard to be affected.

When the coating layer of the present invention is a composite coating layer with at least a double structure including an adhesion layer and a resin layer, it is possible to impart water resistance by an action of the adhesion layer and chemical resistance by an action of the resin layer. Moreover, according to the combination of the adhesion layer and the resin layer of the present invention, both the layers do not mutually inhibit their actions and the adhesion between the adhesion layer and the resin layer is good. It therefore is possible to obtain a coated metal pigment which satisfies both water resistance in an aqueous coating and chemical resistance after the formation of a coating film by virtue of a synergistic effect of the adhesion layer and the resin layer.

As far as the effect of the present invention is maintained, there may be, between the adhesion layer and the resin layer, another layer such as a coupling agent layer composed of a coupling agent such as a silane coupling agent or a titanium coupling agent, a fat layer composed of a constitution of fatty acid/aliphatic amine/aliphatic alcohol/phosphoric ester or the like, or a polysiloxane layer having a residual alkoxyl group.

A particularly preferable example of the another layer formed between the adhesion layer and the resin layer is a coupling agent layer composed of a silane coupling agent having a hydrophobic group or a silylation agent having a hydrophobic group. When such a coupling agent layer is formed, the effect that the adhesion between the adhesion layer and the resin layer increases is imparted because there are many hydrophobic groups in the surface of the adhesion layer and the hydrophobic groups have an action of promoting uniform formation of a resin layer.

In the present invention, it is preferable that a film composed of an oxide or a hydrate containing at least one sort selected from Mo, P and Al is formed between the metal pigment and the adhesion layer. When the above-mentioned layer is formed, the adhesion between the metal pigment and the adhesion layer improves more, and a dense, uniform adhesion layer can be formed.

Examples of a compound containing Mo include peroxopolymolybdic acid represented by a composition formula $Mo_xO_y \cdot mH_2O_2 \cdot nH_2O$ (x is 1 or 2, y is an integer from 2 to 5, m and n denote arbitrary positive numbers), ammonium molybdate and phosphomolybdic acid.

Examples of a compound containing P include orthophosphoric acid, phosphorous acid, hypophosphorous acid, polyphosphoric acid and metaphosphoric acid.

Examples of a compound containing Al include aluminum nitrate. In use of an aluminum pigment as a metal pigment, a boehmite coating may be formed on the surface of the aluminum pigment by dispersing the aluminum pigment in a solution containing ammonia, amine, oxalic acid, or the like and water and treating the solution.

The content of Mo, P and Al in the coating film formed on the surface of the metal pigment is preferably from 0.01 to 5.0 parts by mass, and more preferably from 0.05 to 2.0 parts by mass per 100 parts by mass of the metal pigment. The content of Mo, P and Al is desirably varied depending on the specific surface area of the metal pigment to be treated. It is preferable that the content is made large for a metal pigment with a large specific surface area and that the content is made small for a metal pigment with a small specific surface area. A case where the content of Mo, P and Al is 0.01 parts by mass or more per 100 parts by mass of the metal pigment is preferable because a dense, uniform adhesion layer is easily obtained; a case where the content is 5.0 parts by mass or less is preferable because the color appearance and the metallic glossy appearance of the coated metal pigment are good.

The resin layer in the coated metal pigment of the present invention is preferably a copolymer obtained by copolymerization of at least three kinds of monomers including a reactive monomer having a carboxyl group and/or a phosphoric acid group, a polyfunctional acrylic ester monomer with three or more functionalities, and a polymerizable monomer having a benzene nucleus because it can increase the chemical resistance of a coating film.

The fact that the resin layer of the present invention is a copolymer obtained by copolymerization of three kinds of the above-mentioned monomers can be confirmed, for example, by the following methods. Constituent monomer components can be detected by immersing a coated metal pigment in a mixed acid of hydrochloric acid/nitric acid=1/1 to dissolve metal components, collecting the residue by filtration, drying and making an IR analysis of the sample. Another exemplary method is one in which quality determination of fragments is made by pyrolysis gas chromatography. A monomer component having a phosphoric acid group can be specified by combined use of the IR analysis and a method of analyzing the content of phosphorus in the sample by ICP emission spectroscopic analysis.

Examples of reactive monomers having a carboxyl group and/or a phosphoric acid group include acrylic acid, methacrylic acid, maleic acid, crotonic acid, itaconic acid, fumaric acid, 2-methacryloyloxyethyl acid phosphate, di-2-methacryloyloxyethyl acid phosphate, tri-2-methacryloyloxyethyl acid phosphate, 2-acryloyloxyethyl acid phosphate, di-2-acryloyloxyethyl acid phosphate, tri-2-acryloyloxyethyl acid phosphate, diphenyl-2-methacryloyloxyethyl acid phosphate, diphenyl-2-acryloyloxyethyl acid phosphate, dibutyl-2-methacryloyloxyethyl acid phosphate, dibutyl-2-acryloyloxyethyl acid phosphate, dioctyl-2-methacryloyloxyethyl acid phosphate, dioctyl-2-acryloyloxyethyl acid phosphate, 2-methacryloyloxypropyl acid phosphate, bis(2-chloroethyl) vinyl phosphonate and diallyldibutyl phosphonosuccinate. These may be used singly or in combination of two or more species.

Use of a reactive monomer having a carboxyl group and/or a phosphoric acid group can result in improvement in chemical resistance or adhesion to an object to be coated when forming a coating film because the reactive monomer has an action of improving the adhesion to the adhesion layer of the present invention.

The amount of the reactive monomer having a carboxyl group and/or a phosphoric acid group is preferably adjusted to 0.1 to 10 mass % of the entire portion of the monomer. When the amount of the reactive monomer is adjusted within this range, a coating film having good chemical resistance is obtained. The amount of the reactive monomer is more preferably set within the range of from 0.5 to 5 mass %.

Preferable examples of polyfunctional acrylic ester monomers with three or more functionalities include trimethylolpropane triacrylate, trimethylolpropane trimethacrylate, tetramethylolpropane triacrylate, tetramethylolpropane tetraacrylate, tetramethylolpropane trimethacrylate, tetramethylolpropane tetramethacrylate, pentaerythritol triacrylate, pentaerythritol tetraacrylate, dipentaerythritol hexaacrylate and ditrimethylolpropane tetraacrylate. These may be used singly or in combination of two or more species.

Since a polyfunctional acrylic ester monomer with three or more functionalities contributes to three-dimensional crosslinking of a resin, a resin layer substantially insoluble in an organic solvent and water can be formed when such a polyfunctional acrylic ester monomer is used.

The amount of the polyfunctional acrylic ester monomer is preferably adjusted within the range of from 30 to 90 mass % of the entire portion of the monomer. In such a case, good chemical resistance is imparted to a coating film. The amount of the polyfunctional acrylic ester monomer is more preferably adjusted within the range of from 40 to 80 mass %.

Preferable examples of polymerizable monomers having a benzene nucleus include styrene, α-methylstyrene, vinyltoluene, divinylbenzene, phenyl vinyl ketone, phenyl vinyl ether, divinylbenzene monooxide phenoxyethyl acrylate, phenoxypolyethylene glycol acrylate, 2-hydroxy-3-phenoxypropyl acrylate, 2-acryloyloxyethyl-2-hydroxyethyl phthalic acid and 2-acryloyloxyethylhexahydrophthalic acid. These may be used singly or in combination of two or more species.

By copolymerizing a polymerizable monomer having a benzene nucleus to form a resin layer, the barrier effect against chemicals of this resin layer is improved and the chemical resistance when being converted into a coating film is improved.

The amount of the polymerizable monomer having a benzene nucleus is preferably adjusted within the range of from 5 to 50 mass % of the entire portion of the monomer. In such a case, coating films will have good chemical resistance. The amount of the polymerizable monomer having a benzene nucleus is more preferably set within the range of from 10 to 30 mass %.

<Method of Coated Metal Pigment Production>

The coated metal pigment of the present invention can be obtained, for example, by a production method including an adhesion layer formation step which includes mixing the metal pigment with a solvent containing an alkoxysilane, water and a hydrolysis catalyst and forming the adhesion layer on the surface of the metal pigment through hydrolysis and condensation of the alkoxysilane; a hydrophobization step which includes hydrophobizing the surface of the metal pigment on which the adhesion layer has been formed; and a resin layer formation step which includes dispersing the hydrophobized metal pigment in a nonpolar solvent containing a polymerization initiator and at least three kinds of monomers including a reactive monomer having a carboxyl group and/or a phosphoric acid group, a polyfunctional acrylic ester monomer with three or more functionalities and a polymerizable monomer having a benzene nucleus to deposit the resin layer including a copolymer of the monomers on the surface of the metal pigment.

(Preliminary Step)

The production method mentioned above may further has a preliminary step of forming, before the above-mentioned adhesion layer formation step, a layer composed of an oxide or a hydrate containing at least one sort selected from Mo, P and Al on the surface of the metal pigment. In this case, the adhesion of the metal pigment and the adhesion layer is improved and a dense, uniform adhesion layer can be formed.

The method of forming a film composed of an oxide or a hydrate containing at least one sort selected from Mo, P and Al on the surface of the metal pigment is not particularly restricted. Examples thereof include a method including stirring or kneading a metal pigment and a solution containing a compound containing at least one sort selected from Mo, P and Al in a slurry state or in a paste state.

(Adhesion Layer Formation Step)

On the surface of a metal pigment or, when the preliminary step is provided, on the surface of a metal pigment on which a layer composed of an oxide or a hydrate containing at least one sort selected from Mo, P and Al, an adhesion layer containing polysiloxane and/or silica is formed. As the method of forming an adhesion layer, a method is preferably used in which an alkoxysilane and water are added to a solution in which a metal pigment has been dispersed and the alkoxysilane is hydrolyzed and condensed by adjusting the pH value of the solution with a hydrolysis catalyst, thereby depositing polysiloxane and/or silica on the surface of the metal pigment.

Concretely, from 1 to 20 parts by mass of a metal pigment is dispersed in 100 parts by mass of a treatment solvent. Under stirring, the pH value is adjusted with a hydrolysis catalyst and an alkoxysilane is added while the temperature is kept at 20 to 90° C. At this time, the alkoxysilane may be added either slowly or all at once. The treatment time is preferably from 1 to 48 hours, and more preferably from 3 to 24 hours. Since the pH value of the solution changes during the treatment, the pH value is adjusted by occasional addition of a hydrolysis catalyst. When the treatment is completed, solid-liquid separation with a filter is effected and then, as demanded, heating treatment at 100° C. to 500° C. is effected. The above-mentioned preliminary step and the adhesion layer formation step may be carried out continuously in the same treatment solvent.

As the above-mentioned treatment solvent, hydrophilic solvents are preferably used and examples thereof include methyl alcohol, ethyl alcohol, isopropyl alcohol, n-propyl alcohol, tert-butyl alcohol, n-butyl alcohol, isobutyl alcohol, ethylcellosolve, butylcellosolve, propylene glycol monobutyl ether, dipropylene glycol monomethyl ether, propylene glycol monopropyl ether and acetone. These may be used singly or in combination of two or more species. It is preferable that water enough for hydrolyzing an alkoxysilane is incorporated in the treatment solvent.

Regarding the hydrolysis catalyst, preferable examples of basic catalysts include monoethanolamine, diethanolamine, triethanolamine, ammonia, ethylenediamine, tert-butylamine, γ-aminopropyltriethoxysilane, N-2-aminoethyl-3-aminopropyltriethoxysilane, N-2-aminoethyl-3-aminopropylmethyldimethoxysilane, urea, sodium silicate and sodium hydroxide; preferable examples of acidic catalysts include oxalic acid, acetic acid, nitric acid, sulfuric acid, phosphoric acid and phosphonic acid. These basic catalysts or the acidic catalysts may be used solely or in combination of two or more species.

The pH value of the solution under treatment is preferably adjusted within a range of from 7 to 11, more preferably from 7.5 to 10 in the case of using an alkaline catalyst and within a range of from 1.5 to 4, more preferably from 2 to 3 in the case of using an acid catalyst. In the present invention, when a basic catalyst is used, the rate of adhesion layer formation is higher and the productivity is better.

In the preliminary step and the adhesion layer formation step, a dispersing agent may be added in order to prevent aggregation of the metal pigment. As the kind of a dispersing agent, nonionic surfactants, anionic surfactants, cationic surfactants, polycarboxylic acid-based dispersing agents, polymer dispersing agents, and the like are preferred.

(Hydrophobization Step)

By hydrophobizing the adhesion layer formed in the adhesion layer formation step, it is possible to prevent the aggregation of the metal pigment in the resin layer formation step to form a resin layer uniformly. As a result, a coated metal pigment excellent in chemical resistance can be obtained. In particular, a coated metal pigment having an average particle diameter such that the difference between the average particle diameter of the metal pigment as the raw material and that of the coated metal pigment is not greater than 2 μm is preferred from the viewpoint of hiding ability and chemical resistance.

The method of hydrophobizing the surface of an adhesion layer is not particularly restricted. Preferably used are, for example, a method in which a silane coupling agent or a silylation agent having a hydrophobic group is added to a solution after the adhesion layer formation step, and a method in which a silane coupling agent or a silylation agent having a hydrophobic group is added together with water and a hydrolysis catalyst under kneading to a metal pigment prepared through solid-liquid separation after the adhesion layer formation step and conversion into a paste. In such cases, a coupling agent layer composed of a silane coupling agent having a hydrophobic group or a silylation agent having a hydrophobic group is formed on the surface of the adhesion layer. In other words, the surface of the adhesion layer comes to have many hydrophobic groups in a silane coupling agent or a silylation agent and the surface of the adhesion layer is hydrophobized. A hydrophobic group in a silane coupling agent or a silylation agent serves to promote uniform formation of a resin layer to be formed later and also serves to improve the adhesion between an adhesion layer and a resin layer. In other words, because of presence of many hydrophobic groups in the surface of the adhesion layer, a resin layer formed later will be in a state such that it easily adheres to the surface of the adhesion layer when depositing on the surface of a metal pigment through polymerization, and it becomes possible to form a resin layer more uniformly and the adhesion between the adhesion layer and the resin layer will be improved in comparison to the case of failing to hydrophobize the surface of the adhesion layer. Preferable examples of a silane coupling agent or a silylation agent include methyltriethoxysilane, methyltrimethoxysilane, methyldiethoxysilane, hexyltriethoxysilane, octyltriethoxysilane, decyltriethoxysilane, octadecyltriethoxysilane, phenyltriethoxysilane, diphenyldiethoxysilane, nonylphenyltriethoxysilane, hexamethyldisilazane and N,O-bis(trimethylsilyl)acetamide. Among these, a silane coupling agent or a silylation agent having the hydrophobic group(s) including 6 or more, more preferably 8 or more carbon atoms is preferred. When the number of carbon atoms is 6 or more, the hydrophobic group is easier to adhere to a resin layer which will be formed later and it becomes possible to form a resin layer more uniformly.

(Resin Layer Formation Step)

As a method of forming a resin layer, a method is preferably used in which a metal pigment resulting from the adhesion layer formation step is subjected to solid-liquid separation, followed, as demanded, by washing and filtering with a nonpolar solvent, the metal pigment is then dispersed in a nonpolar solvent, a polymerizable monomer and a polymerization initiator are then added and the monomer is polymerized under stirring and heating, and a resin which has become insoluble in the solvent is deposited on the surface of the metal pigment.

In use of this method, the coating efficiency of a resin layer is higher and a thicker resin layer can be formed in comparison to, for example, a method in which polymerizable double bonds are introduced in a polysiloxane-coated surface and then resin coating is applied via covalent bonds.

The polymerization reaction is preferably effected in a non-oxidizing atmosphere, for example, in an inert gas such as nitrogen and argon because if the atmosphere is an oxidizing atmosphere, radicals which contribute to the polymerization reaction tend to disappear easily and the polymerization efficiency of the monomer tends to decrease. The reaction temperature is properly from 50 to 150° C., and more preferably from 70 to 100° C. in view of the working environment and safety because if it is too low, the polymerization efficiency tends to decrease and if it is too high, the solvent evaporates easily.

As the nonpolar solvent, a hydrocarbon solvent is particularly preferred. Examples of preferable nonpolar solvents include mineral spirit, petroleum benzine, solvent naphtha, isoparaffin, normal paraffin, benzene, toluene, xylene, cyclohexane, hexane, heptane, octane, chlorobenzene, trichlorobenzene, perchloroethylene and trichloroethylene. These may be used singly or in combination of two or more species. In use of a nonpolar solvent, the deposition efficiency of a resin is good and therefore it is possible to coat the surface of a metal pigment with a sufficient amount of a resin. Moreover, as needed, for example in order to dissolve or disperse a monomer, polar solvents such as ketones, esters and alcohols may be mixed in an amount not more than 30 mass %.

As the reactive monomer having a carboxyl group and/or a phosphoric acid group, the polyfunctional acrylic ester monomer with three or more functionalities and the polymerizable monomer having a benzene nucleus, those previously mentioned may be used. In addition to these monomers, one species or a combination of two or more species among methyl methacrylate, butyl acrylate, 2-ethylhexyl acrylate, lauryl acrylate, stearyl acrylate, cyclohexyl acrylate, 2-hydroxyethyl acrylate, 2-hydroxybutyl acrylate, 2-methoxyethyl acrylate, 2-diethylaminoethyl acrylate, butyl methacrylate, octyl methacrylate, 1,4-butanediol diacrylate, 1,6-hexanediol diacrylate, 1,9-nonanediol diacrylate, neopentyl glycol diacrylate, tripropylene glycol diacrylate, tetraethylene glycol diacrylate, acrylic nitrile, methacrylic nitrile, vinyl acetate, vinyl propionate, polybutadiene, linseed oil, soybean oil, epoxidized soybean oil, epoxidized polybutadiene, cyclohexene vinyl monoxide and the like may also be used.

As a polymerization initiator, peroxides such as benzoyl peroxide, lauroyl peroxide, isobutyl peroxide and methyl ethyl ketone peroxide, azo compounds such as azobisisobutyronitrile, and the like can suitably be used.

After the completion of the resin layer formation step, the slurry is forced to pass through a filter, thereby being subjected to solid-liquid separation to yield a coated metal pigment in paste form having an appropriate solid content. The coated metal pigment in paste form may be imparted dispersibility in water and the like through addition of a dispersing agent or a surfactant. Affinity to an aqueous coating may also be imparted through replacement of the nonpolar solvent contained in the coated metal pigment in paste form by a hydrophilic solvent.

Examples of a dispersing agent and a surfactant include polyoxyethylene alkyl ether, polyoxyethylene alkylphenol ether, polyoxyethylene alkylamine, polyoxyethylene alkylphosphoric acid, metal soaps and polycarboxylic acid-based dispersing agents.

Examples of hydrophilic solvents include methyl alcohol, ethyl alcohol, isopropyl alcohol, n-propyl alcohol, tert-butyl alcohol, n-butyl alcohol, isobutyl alcohol, ethylcellosolve, butylcellosolve, propylene glycol monobutyl ether, dipropylene glycol monomethyl ether, propylene glycol monopropyl ether and acetone.

Generally, in surface treatment of a metal pigment, the average particle diameter of the metal pigment after the surface treatment tends to become larger through partial generation of aggregated particles. In the production method of the present invention, however, it is preferable that the ratio of the average particle diameter (A) of the coated metal pigment to the average particle diameter (B) of the metal pigment before the adhesion layer formation step, (A)/(B), is adjusted to not less than 1.0 and not more than 1.1. Since the adhesion layer is formed on the surface of the metal pigment through the adhesion layer formation step, the above-mentioned ratio (A)/(B) is, by nature, not less than 1.0. When the ratio (A)/(B) is not more than 1.1, even in observation of the coated metal pigment by an electron microscope, a state in which a superfine powder up to 1 μm is adhered to the surface of metal pigment flakes is recognized, but a state in which particles of the coated metal pigment are united is not recognized. This means that almost no aggregation of the coated metal pigment has occurred. When a coating film is produced from a coated metal pigment whose (A)/(B) ratio is adjusted to not more than 1.1, the hiding ability and the chemical resistance become particularly satisfactory.

The above-mentioned average particle diameter (A) and average particle diameter (B) can be measured, for example, by laser diffractometry.

The coated metal pigment of the present invention can be converted into a coating composition in combination with a binder. In the coating composition of the present invention, it is preferable that the content of the coated metal pigment is adjusted within the range of from 0.1 to 50 parts by mass, preferably from 1 to 30 parts by mass, per 100 parts by mass of the binder. When the content of the coated metal pigment is 0.1 parts by mass or more, a desired design can be obtained well; and when it is 50 parts by mass or less, a coating film has good image clarity.

The binder to be incorporated in the coating composition of the present invention is not particularly restricted, and examples thereof include thermosetting acrylic resin/melamine resin, thermosetting acrylic resin/CAB (cellulose acetate butyrate)/melamine resin, thermosetting polyester (alkyd) resin/melamine resin, thermosetting polyester (alkyd)/CAB/melamine resin, isocyanate-curing urethane resin/normal temperature curable acrylic resin and water-dilution acrylic emulsion/melamine resin.

In a coating composition, an appropriate solvent may be used. Although water is preferred as a solvent, organic solvents, such as alcohols, glycols, ketones, esters, ethers and hydrocarbons, may also be used.

As demanded, additives such as pigment dispersants, defoamers, antisettling agents and curing catalysts, and other coloring pigments such as organic coloring pigments, inorganic coloring pigments, pearl mica, alumina flakes, lamellar iron oxide and silica flakes may be incorporated.

The coated metal pigment of the present invention is used particularly suitably for normal temperature curable water-based coatings. Such normal temperature curable water-based coatings may be not only of one-component type, but also of two or more-component combination type. Moreover, one accompanied by a reaction is also available. As the emulsion or water-soluble binder used for normal temperature curable water-based coatings, various polymers can be used as natural or synthetic polymers, such as acrylic polymers, alkyd polymers, polyester polymers, urethane polymers, vinyl acetate polymers and silicon polymers, or oligomers, prepolymers, and the like.

EXAMPLES

The present invention is described in more detail below with reference to Examples, but the invention is not limited thereto.

Example 1

In 600 g of isopropyl alcohol (hereinafter abbreviated as IPA), a solution obtained by adding 0.5 g of a molybdenum metal powder in small portions to 10 g of a hydrogen peroxide solution containing 30 mass % of hydrogen peroxide was dissolved. In addition, 153.8 g (corresponding to 100 g of aluminum) of a commercially available aluminum pigment (Toyo Aluminium Kabushiki Kaisha, 7640NS; solid content: 65 mass %, average particle diameter: 17.0 μm) as a metal pigment, and 0.6 g of a dispersing agent were added, followed by stirring and mixing at 50° C. for 1 hour (preliminary step).

The pH value of the slurry obtained above was adjusted to 8.5 by adding 30 g of water and monoethanolamine to the slurry.

30 g of tetraethoxysilane (hereinafter abbreviated as TEOS) was added slowly to the pH-adjusted slurry, followed by stirring and mixing at 70° C. for 10 hours. During this operation, the pH value of the slurry was checked every 2 hours and it was adjusted to 8.5 by addition of monoethanolamine (adhesion layer formation step). Then, 3 g of n-decyltrimethoxysilane was added to the slurry, followed by stirring and mixing at 70° C. for 2 hours (hydrophobization step).

After the completion of the reaction, the slurry was subjected to solid-liquid separation with a filter and the resulting paste was washed and filtered with mineral spirit. An aluminum pigment in paste form having a solid content of 60 mass % was thus obtained. 167 g of the obtained aluminum pigment in paste form was charged into a 1-liter separable flask, to which 600 g of mineral spirit was then added. The system was stirred under introduction of a nitrogen gas and the temperature thereof was increased to 80° C. Subsequently, 0.2 g of acrylic acid, 4 g of epoxidized polybutadiene, 5 g of trimethylolpropane triacrylate, 1.8 g of divinylbenzene, and 0.75 g of azobisisobutyronitrile were added, and polymerization was effected at 80° C. for 6 hours. Following the completion of the polymerization, the slurry was filtered. A coated aluminum pigment in paste form having a solid content of 60 mass % and an average particle diameter of 17.5 μm was thus obtained as a coated metal pigment (resin layer formation step).

10 g of the resulting coated aluminum pigment in paste form was dispersed in 100 g of acetone. After leaving at rest at 40° C. for 10 days, filtering by suction through a glass filter was effected. Solid content measurement and quantitative determination of the amount of the resin components in the filtrate by gas chromatography showed that the amount of the resin eluted per 100 g of the coated aluminum pigment was 0.1 g or less.

5 g of the coated aluminum pigment dried after the filtering by suction mentioned above was dissolved in a solution of nitric acid/hydrochloric acid=1/1, and the insoluble component was collected by filtration, dried, and then quantitatively determined. In addition, the contents of Si in the solution and the insoluble component were quantitatively determined by ICP emission analysis and X-ray fluorescence analysis.

Based on these results of quantitative determination and using the following formulas:

Amount (g) of silica=(amount (g) of Si in mixed acid solution×60/28+amount (g) of Si in insoluble component×60/28)/(amount (g) of coated aluminum pigment−amount (g) of Si in mixed acid solution×60/28−amount (g) of insoluble component)×100 (g)

Amount (g) of resin=(amount (g) of insoluble component−amount (g) of Si in insoluble component× 60/28)/(amount (g) of coated aluminum pigment−amount (g) of Si in mixed acid solution× 60/28−amount (g) of insoluble component)×100 (g), the amounts of silica and the resin relative to 100 g of Al in the aluminum pigment were calculated. The amount of silica was 7 g; the amount of the resin was 10.5 g.

Example 2

0.5 g of orthophosphoric acid was dissolved in 600 g of IPA. In addition, 153.8 g (corresponding to 100 g of aluminum) of a commercially available aluminum pigment (Toyo Aluminium Kabushiki Kaisha, 7640NS; solid content: 65 mass %) as a metal pigment, and 0.6 g of a dispersing agent were added, followed by stirring and mixing at 50° C. for 1 hour (preliminary step).

The pH value of the slurry obtained above was adjusted to 8.5 by adding 30 g of water and aqueous ammonia to the slurry.

30 g of tetraethoxysilane was added slowly to the pH-adjusted slurry, followed by stirring and mixing at 70° C. for 10 hours. During this operation, the pH value of the slurry was checked every 2 hours and it was adjusted to 8.5 by addition of aqueous ammonia (adhesion layer formation step). Then, 3 g of phenyltrimethoxysilane was added to the slurry, followed by stirring and mixing at 70° C. for 2 hours (hydrophobization step).

After the completion of the reaction, the slurry was subjected to solid-liquid separation with a filter. An aluminum pigment in paste form having a solid content of 60 mass % was thus obtained. 1 g of 2-methacryloyloxyethyl acid phosphate was added after being dissolved in 10 g of IPA to 167 g of the resulting aluminum pigment in paste form, followed by kneading. Subsequently, the mixture was charged into a 1-liter separable flask, to which 600 g of mineral spirit was then added. The system was stirred under introduction of a nitrogen gas and the temperature thereof was increased to 80° C. Subsequently, 0.2 g of acrylic acid, 4 g of methyl methacrylate, 5 g of tetramethylolpropane triacrylate, 1.8 g of styrene, and 0.75 g of azobisisobutyronitrile were added, and polymerization was effected at 80° C. for 6 hours. Following the completion of the polymerization, the slurry was filtered. A coated aluminum pigment in paste form having a solid content of 60 mass % and an average particle diameter of 18.3 μm was thus obtained as a coated metal pigment (resin layer formation step).

The coated aluminum pigment obtained was analyzed in the same manner as in Example 1; the amount of the resin eluted in acetone was 0.1 g or less (per 100 g of the coated aluminum pigment), the amount of silica was 7.2 g (per 100 g of aluminum), and the amount of the resin was 10.8 g (per 100 g of aluminum).

Example 3

To 600 g of propylene glycol monomethyl ether, 100 g of commercially available silver-coated glass flakes (Nippon Sheet Glass Co., Ltd., 2025PS; solid content: 100 mass %; average particle diameter: 24. 3 μm) and 1 g of γ-aminopropyltriethoxysilane were added, followed by stirring and mixing at 50° C. for 1 hour.

The pH value of the slurry obtained above was adjusted to 8.5 by adding 80 g of water and urea to the slurry. 30 g of tetraethoxysilane was added slowly to the pH-adjusted slurry, followed by stirring and mixing at 70° C. for 10 hours. During this operation, the pH value of the slurry was checked every 2 hours and it was adjusted to 8.5 by addition of urea (adhesion layer formation step). Then, 3 g of dimethyldimethoxysilane was added to the slurry, followed by stirring and mixing at 70° C. for 2 hours (hydrophobization step).

After the completion of the reaction, the slurry was subjected to solid-liquid separation with a filter, followed by drying. Silver-coated glass flakes coated with silica were thus obtained. 100 g of the obtained silver-coated glass flakes were charged into a 1-liter separable flask, to which 600 g of mineral spirit was then added. The system was stirred under introduction of a nitrogen gas and the temperature thereof was increased to 80° C. Subsequently, 1 g of acrylic acid, 4 g of glycidyl methacrylate, 5 g of trimethylolpropane trimethacrylate, 1.8 g of vinyltoluene, and 0.75 g of azobisisobutyronitrile were added, and polymerization was effected at 80° C. for 6 hours. Following the completion of the polymerization, the slurry was filtered and dried. Coated silver-coated glass flakes having an average particle diameter of 25.4 μm were thus obtained as a coated metal pigment (resin layer formation step).

Comparative Example 1

0.5 g of orthophosphoric acid was dissolved in 600 g of IPA. In addition, 153.8 g (corresponding to 100 g of aluminum) of a commercially available aluminum pigment (Toyo Aluminium Kabushiki Kaisha, 7640NS; solid content: 65 mass %; average particle diameter: 17.0 μm) as a metal pigment was added, followed by stirring and mixing at 50° C. for 1 hour.

The pH value of the slurry obtained above was adjusted to 8.5 by adding aqueous ammonia to the slurry. 60 g of tetraethoxysilane was added slowly to the pH-adjusted slurry, followed by stirring and mixing at 70° C. for 10 hours. During this operation, the pH value of the slurry was checked every 2 hours and it was adjusted to 8.5 by addition of aqueous ammonia. Then, 3 g of phenyltrimethoxysilane was added to the slurry, followed by stirring and mixing at 70° C. for 2 hours. Following the completion of the reaction, the slurry was subjected to solid-liquid separation with a filter. A coated aluminum pigment in paste form having a solid content of 60 mass % and an average particle diameter of 19.4 μm was thus obtained as a coated metal pigment.

The coated aluminum pigment obtained was analyzed in the same manner as in Example 1; the amount of the resin eluted in acetone was 0.1 g or less (per 100 g of the coated aluminum pigment) and the amount of silica was 13.5 g (per 100 g of aluminum). The amount of resin was not analyzed.

Comparative Example 2

153.8 g (corresponding to 100 g of aluminum) of a commercially available aluminum pigment (Toyo Aluminium Kabushiki Kaisha, 7640NS; solid content: 65 mass %) was washed and filtered with mineral spirit. An aluminum pigment in paste form having a solid content of 60 mass % was thus obtained. 167 g of the obtained aluminum pigment in paste form was charged into a 1-liter separable flask, to which 600 g of mineral spirit was then added. The system was stirred under introduction of a nitrogen gas and the temperature thereof was increased to 80° C. Subsequently, 0.4 g of acrylic acid, 8 g of epoxidized polybutadiene, 10 g of trimethylolpropane triacrylate, 3.6 g of divinylbenzene, and 0.75 g of azobisisobutyronitrile were added, and polymerization was effected at 80° C. for 6 hours. Following the completion of the polymerization, the slurry was filtered. A coated aluminum pigment in paste form having a solid content of 60 mass % and an average particle diameter of 19.2 μm was thus obtained as a coated metal pigment.

The coated aluminum pigment obtained was analyzed in the same manner as in Example 1; the amount of the resin eluted in acetone was 0.1 g or less (per 100 g of the coated aluminum pigment) and the amount of the resin was 18.5 g (per 100 g of aluminum). The amount of silica was not analyzed.

Comparative Example 3

153.8 g (corresponding to 100 g of aluminum) of a commercially available aluminum pigment (Toyo Aluminium Kabushiki Kaisha, 7640NS; solid content: 65 mass %) was washed and filtered with test benzine. An aluminum pigment in paste form having a solid content of 60 mass % was thus obtained. 167 g of the obtained aluminum pigment in paste form was charged into a 1-liter separable flask, to which 600 g of test benzine was then added. The temperature of the system was increased to 120° C. Subsequently, 3.8 g of 3-methacryloxypropyltrimethoxysilane was added after being dissolved in 10 g of test benzine and then 0.15 g of vinylphosphonic acid was added after being dissolved in 10 g of mineral spirit. 0.15 g of water and 2.5 g of 2-buthanol were further added and the mixture was stirred at 120° C. for 1 hour. Then, 6 g of methylolpropane triacrylate was added after being dissolved in 10 g of mineral spirit and thereafter a liquid prepared by suspending 0.2 g of 2-2 azobis (2-methylpropanenitrile) in 5 g of test benzine was introduced over 30 minutes. Subsequently, after stirring the slurry at 120° C. for another 5 hours and allowing to cool for 2 hours, the slurry was subjected to solid-liquid separation with a filter. A coated aluminum pigment in paste form having a solid content of 60 mass % was thus obtained as a coated metal pigment.

The coated aluminum pigment obtained was analyzed in the same manner as in Example 1; the amount of the resin eluted in acetone was 0.2 g (per 100 g of the coated aluminum pigment), the amount of silica was 0.8 g (per 100 g of aluminum), and the amount of the resin was 4.1 g (per 100 g of aluminum).

TABLE 1

|  | Amount of resin eluted in acetone (g) (per 100 g of coated aluminum pigment) | Amount of silica (g) (per 100 g of Al) | Amount of resin (g) (per 100 g of Al) |
| --- | --- | --- | --- |
| Example 1 | 0.1 or less | 7 | 10.5 |
| Example 2 | 0.1 or less | 7.2 | 10.8 |
| Example 3 | — | — | — |
| Comparative Example 1 | 0.1 or less | 13.5 | Not analyzed |
| Comparative Example 2 | 0.1 or less | Not analyzed | 18.5 |
| Comparative Example 3 | 0.2 | 0.8 | 4.1 |

<Evaluation of Average Particle Diameter>

For the coated metal pigments prepared in Examples 1 to 3 and Comparative Examples 1 to 3, the average particle diameter (A) of the coated metal pigment and the average particle diameter (B) of the metal pigment before the adhesion layer formation step were measured by the laser diffractometry using Microtrac HRA 9320-X100 and toluene as a dispersion medium. Then, the average particle diameter ratio (A)/(B) was calculated. The results are shown in Table 2.

TABLE 2

|  | Average particle diameter | | |
| --- | --- | --- | --- |
|  | Coated metal pigment (A) (μm) | Before adhesion layer formation (B) (μm) | (A)/(B) |
| Example 1 | 17.5 | 17 | 1.03 |
| Example 2 | 18.3 | 17 | 1.08 |
| Example 3 | 25.4 | 24.3 | 1.05 |
| Comparative Example 1 | 19.4 | 17 | 1.14 |
| Comparative Example 2 | 19.2 | 17 | 1.13 |
| Comparative Example 3 | 19.8 | 17 | 1.16 |

Examples 4 to 6, Comparative Examples 4 to 8

Normal temperature curable water-based coatings were prepared under the following preparation conditions using, respectively, the coated metal pigments obtained in Examples 1 to 3 and Comparative Examples 1 to 3 and, as commercially available pigments, a commercially available non-coated aluminum pigment (Toyo Aluminium Kabushiki Kaisha, 7640NS; solid content: 65 mass %, average particle diameter: 17.0 μm) and a commercially available silver-coated glass flake (Nippon Sheet Glass Co., Ltd., 2025PS; solid content: 100 mass %, average particle diameter: 24.3 μm). Plastic-coated plates were then produced.

(Preparation of Mill Base)

Coated metal pigment or commercially available pigment: 30 parts by mass (in terms of solid)

Dispersing agent (The Nippon Synthetic Chemical Industry Co., Ltd., JURYMER 10): 1.0 part by mass Water: 50 parts by mass (Preparation of Coating)

Mill base: 40 parts by mass

Acrylic emulsion: 60 parts by mass (Shin-Nakamura Chemical Co., Ltd., NK polymer MK-100WL-5)

(Spray Conditions)

A coating was diluted in a solution of water/IPA/butylcellosolve=70/20/10 and was applied to a 2-mm thick ABS plate in a film thickness of 10 μm.

<Coating Stability Test>

150 g of a coating prepared in the manner described above was sampled and the amount of a hydrogen gas generated when the coating was stored at 40° C. for 10 days was measured. Furthermore, the color appearance of spray-coated plates before and after the test was measured with a color difference meter (Minolta Co., Ltd., CR400), and the color difference value (ΔE) between before and after the test was calculated. The results are shown in Table 3.

<Chemical Resistance Test of Coated Film>

A spray-coated plate was immersed in a 5 mass % sodium carbonate solution. The color appearance change which occurred when the plate was left at rest at a normal temperature for 24 hours was evaluated with a color difference meter, and the ΔE was calculated. The results are shown in Table 3.

TABLE 3

| | | Coating stability | | | Chemical resistance ΔE |
|---|---|---|---|---|---|
| | Metal pigment | Color appearance (L*15) | Gas generation (ml) | ΔE | |
| Example 4 | Example 1 | 155 | 0 | 0.2 | 0.7 |
| Example 5 | Example 2 | 153 | 0 | 0.4 | 1.2 |
| Example 6 | Example 3 | 122 | 0 | 0.8 | 0.5 |
| Comparative Example 4 | Comparative Example 1 | 148 | 0 | 1.5 | 15.1 |
| Comparative Example 5 | Comparative Example 2 | 146 | 25 | 3.5 | 4.2 |
| Comparative Example 6 | Comparative Example 3 | 138 | 6 | 1.5 | 8.5 |
| Comparative Example 7 | 7640NS | 158 | 30 | 5.1 | 17.5 |
| Comparative Example 8 | 2025PS | 125 | 0 | 8.5 | 6.7 |

The results in Table 3 show that the color difference values ΔE between before and after the storage at 40° C. in the coatings of Examples 4 to 6 are within the range of from 0.2 to 0.8, which are remarkably smaller than the values of coatings of Comparative Examples 4 to 8 within the range of from 1.5 to 8.5. This fact indicates that the coating stability of the coatings of Examples 4 to 6 according to the present invention is good. In other words, these results show that the coated metal pigment of the present invention is excellent in water resistance.

Moreover, the color difference values ΔE between before and after the immersion of the coating films formed from the coatings of Examples 4 to 6 in a sodium carbonate solution are within the range of from 0.5 to 1.2, which are remarkably smaller than the values of the coating films formed from the coatings of Comparative Examples 4 to 8 within the range of from 4.2 to 17.5. This fact indicates that the coating films from the coatings of Examples 4 to 6 according to the present invention are of good chemical resistance.

It should be construed that the embodiments and the Examples disclosed herein are non-limiting and only illustrative. It is intended that the scope of the present invention is indicated not by the description provided above but by the claims, and all meanings equivalent to the claims and all modifications within the range of equivalence to the claims are included.

INDUSTRIAL APPLICABILITY

Since an aqueous coating prepared by use of the coated metal pigment of the present invention has excellent water resistance and a coating film containing the coated metal pigment is excellent in chemical resistance, the coated metal pigment according to the present invention can be used suitably as a metallic pigment to be used for coating metals, plastics and the like in the fields of vehicle coating, building material coating, printing ink, and the like.

The invention claimed is:

1. A coated metal pigment for an aqueous coating which comprises:

a metal pigment having an average major axis of from 1 to 100 μm and a composite coating layer, wherein the material of said metal pigment is aluminum or its alloy, iron or its alloy, copper or its alloy, or material prepared by coating metal or an alloy on glass flakes, and said composite coating layer comprises an adhesion layer which is disposed on the surface of said metal pigment either in contact with said metal pigment or with another layer disposed between said metal pigment and said adhesion layer and contains polysiloxane and/or silica, and a resin layer which is disposed on the surface of said adhesion layer with a coupling agent layer disposed between said adhesion layer and said resin layer and comprising a silane coupling agent having a hydrophobic group or a silylation coupling agent having a hydrophobic group, both the silane coupling agent and the silylation coupling agent being free of a polymerizable double bond, wherein said resin layer is a copolymer obtained by copolymerization of at least three kinds of monomers including a reactive monomer having a carboxyl group and/or a phosphoric acid group, a polyfunctional acrylic ester monomer with three or more functionalities, and a polymerizable monomer having a benzene nucleus, and wherein said copolymerization is solution polymerization.

2. The coated metal pigment according to claim 1, wherein a layer comprising an oxide or a hydrate containing at least one member selected from the group consisting of Mo, P and Al is further formed between said metal pigment and said adhesion layer.

3. The coated metal pigment according to claim 1, wherein said coupling agent layer comprises at least one species selected from the group consisting of methyltriethoxysilane, methyltrimethoxysilane, methyldiethoxysilane, hexyltriethoxysilane, octyltriethoxysilane, decyltriethoxysilane, octadecyltriethoxysilane, phenyltriethoxysilane, diphenyldiethoxysilane, nonylphenyltriethoxysilane, hexamethyldisilazane and N,O-bis(trimethylsilyl)acetamide.

4. The coated metal pigment according to claim 1, wherein said silane coupling agent or said silylation agent has the hydrophobic group including 6 or more carbon atoms.

5. A coating composition comprising the coated metal pigment according to claim 1 and a binder.

6. A method for producing a coated metal pigment according to claim 1, which comprises:

mixing said metal pigment with a solvent containing an alkoxysilane, water and a hydrolysis catalyst and forming an adhesion layer on the surface of said metal pigment through hydrolysis and condensation of said alkoxysilane;

hydrophobizing the surface of said adhesion layer by forming a coupling agent layer from a silane coupling agent having a hydrophobic group or a silylation coupling agent having a hydrophobic group, both the silane coupling agent and the silylation coupling agent being free of a polymerizable double bond; and dispersing said hydrophobized metal pigment in a nonpolar solvent containing a polymerization initiator and at least three kinds of monomers including a reactive monomer having a carboxyl group and/or a phosphoric acid group, a polyfunctional acrylic ester monomer with three or more functionalities and a polymerizable monomer having a benzene nucleus to form a resin layer comprising a copolymer of said monomers on the surface of the metal pigment.

7. The method for producing a coated metal pigment according to claim 6, wherein the ratio of the average particle diameter (A) of said coated metal pigment to the average particle diameter (B) of the metal pigment before formation of said adhesion layer, (A)/(B), is not less than 1.0 and not more than 1.1.

8. A coating composition comprising the coated metal pigment obtained by the method according to claim 6 and a binder.

9. A coated product produced by coating a product with a coated metal pigment produced by the method of claim 6.

10. The method for producing a coated metal pigment according to claim 6, wherein prior to formation of said adhesion layer, a layer comprising an oxide or a hydrate containing at least one member selected from the group consisting of Mo, P and Al is formed on the surface of said metal pigment.

11. The method for producing a coated metal pigment according to claim 10, wherein the ratio of the average particle diameter (A) of said coated metal pigment to the average particle diameter (B) of the metal pigment before formation of said adhesion layer, (A)/(B), is not less than 1.0 and not more than 1.1.

12. A product which possesses excellent coating storage stability by exhibiting excellent water resistance and excellent chemical resistance, said product containing the coated metal pigment of claim 1.

13. The product of claim 12, wherein said product is a metal, a plastic, a building material or a printing ink.

14. The coated metal pigment of claim 1, wherein the adhesion layer has a thickness of about 5 to 50 nm.

15. The coated metal pigment of claim 1, wherein the resin constituting the resin layer is a resin, substantially insoluble in organic solvents and water.

16. The coated metal pigment of claim 15, wherein the amount of the resin layer is within the range of 1 to 100 parts by mass per 100 parts by mass of the metal pigment.

* * * * *